United States Patent Office 2,706,723
Patented Apr. 19, 1955

2,706,723

WATER REPELLENT TREATMENT FOR MASONRY AND SILOXANE COMPOSITION

Shailer L. Bass, Midland, Mich., assignor to Dow Corning Corporation, Midland, Mich., a corporation of Michigan No Drawing. Original application June 21, 1951, Serial No. 232,869. Divided and this application January 21, 1952, Serial No. 267,512

10 Claims. (Cl. 260—42)

The present invention relates to methods and compositions for rendering masonry water repellent.

Heretofore methods for rendering masonry water repellent have involved treatment with materials such as paraffin and a drying oil, aluminum stearate, oleoresins in vegetable oil vehicles such as linseed oil, and emulsions of various resins, usually with plasticizers such as polyvinyl acetate and polystyrene.

The ideal above-grade masonry water repellent, however, should incorporate a combination of a number of features, and the prior art methods have invariably been satisfactory with regard to only a few of the desired properties. The desirable properties are: (1) Long life (in excess of one to three years). A short life is one of the chief shortcomings of the present commercial products. (2) Deep penetration. This requirement is closely related to long life, for weathering at the surface does not destroy the water repellency of a deeply penetrating treatment. (3) Quick development of water repellency. This characteristic is important in cases of hard rain shortly after application. (4) No tendency to clog pores of masonry. This is important because a treated surface should have the ability to "breathe" or tranmit water vapor. (5) Clear and invisible film, causing no change in color or character of masonry. (6) The treated surface should be capable of being painted over and bonding tightly to the dried paint film. (7) Application should be possible even at the lowest practical working temperatures (as low as 20° F.). (8) Solubility in inexpensive solvents, allowing economical application. (9) Easy to apply by spraying or brushing.

The general water-repellent properties of organo-polysiloxanes are known. Certain compositions comprising these siloxanes have met with a certain degree of success as clear masonry water repellents. These organosiloxane compositions, however, have been found lacking in several of the desirable properties listed above. The known materials have tended to be either too slow in the development of their water-repellent properties, have given too low a degree of water repellency, or else are subject to a too rapid deterioration upon weathering and aging.

It is an object of the present invention to provide an improved and more economical method and composition for rendering masonry surfaces water repellent, said method and composition containing in combination the desirable features listed above.

The essential ingredient of the composition of this invention is a partial hydrolyzate of an alkoxylated mixture of by-product chlorosilicon compounds obtained from the reaction of $CH_3Cl$ and Si, said partial hydrolyzate containing from 20 to 50 per cent by weight alkoxy.

The aforesaid reaction of $CH_3Cl$ and Si is conducted within the temperature range of 200° to 500° C., preferably with copper as a catalyst, giving $CH_3SiCl_3$ and $(CH_3)_2SiCl_2$ as the major products. This method is disclosed in detail in U. S. Patent No. 2,380,995. A hydrogen halide may be used in conjunction with the $CH_3Cl$ in this process to give improved yields, as disclosed in U. S. Patent No. 2,488,487. Commercial use of the products of this process has been limited strictly to use of the above methylchlorosilanes obtained as the major products.

The by-products of the aforesaid reaction are defined as the distillable chlorosilanes boiling above $(CH_3)_2SiCl_2$, i. e., above 69.8° C. at atmospheric pressure. These by-products are comprised of organic-substituted and non-organic-substituted silanes, disilanes, disiloxanes, silmethylenes and silethylenes; and a large portion of completely unidentified organosilicon compounds. There is at present no known commercial method of separating these components into fractions of even the slightest degree of purity. This is because of the large number of individual silicon compounds present, the relatively small percentage of each, the close boiling points of the compounds, and the presence of a variety of by-produced hydrocarbons which boil throughout the boiling range of the silicon compounds. Consequently the fractionation of these materials through even the best of laboratory distillation columns, with subsequent redistillation of selected portions of the distillate, has resulted in the isolation and identification of only a comparatively few of the compounds present. Table I lists the few known compounds and their approximate boiling points found in the by-products of a representative industrial scale reaction of $CH_3Cl+Si$. The boiling points are in degrees centigrade at atmospheric pressure.

TABLE I

| Compound: | B. P. °C. |
|---|---|
| Benzene | 80 |
| 2-methylhexane | 90 |
| 3-methylhexane | 91 |
| Methylcyclohexane | 99 |
| Ethyltrichlorosilane | 100 |
| Ethylmethyldichlorosilane | 102 |
| Toluene | 110 |
| Hydrocarbons | 111–116 |
| Isopropyltrichlorosilane | 118 |
| Isopropylmethyldichlorosilane | 119 |
| n-Propyltrichlorosilane | 124 |
| n-Propylmethyldichlorosilane | 125 |
| Hexachlorodisiloxane | 128 |
| Ethylbenzene | 134.6 |
| $CH_3Cl_2SiOSiCl_3$ | 140 |
| Isobutyltrichlorosilane | 141.5 |
| Hexachlorodisilane | 146 |
| $(CH_3)_2ClSi \cdot SiCl_3$ | 157 |
| $CH_3Cl_2SiOSiCl_2CH_3$ | 158 |
| Ethyltoluene | 162 |
| Diethylbenzene | 175 |
| $(CH_3)_2ClSiCH_2SiCl(CH_3)_2$ | 178 |
| $(CH_3)_2ClSiCH_2SiCl_3$ | 185 |
| $Cl_2SiCH_2SiCl_3$ | 185 |
| $Cl_3SiCH_2SiCl_2CH_3$ | 189 |
| $CH_3Cl_2SiCH_2SiCl_2CH_3$ | 192 |
| $C_6H_5SiCl_3$ | 201 |
| $CH_3Cl_2SiCH_2CH_2SiCl_3$ | 206 |

The relative proportions present of the above-identified compounds are unknown, for only a few grams of each pure material can be isolated from large quantities of the starting mixture of by-products. This is due to the fact that a first distillation of the mixture gives a distillate of gradually increasing boiling point. There are none of the usual "plateaux" of constant boiling material present in the distillate. Repeated fractionations of selected distillate fractions are necessary to obtain small portions of relatively pure material. The identity of the material boiling between the various identified compounds has not been established. The mixture of by-products ordinarily has an atomic ratio of hydrolyzable Cl to Si ranging from 2.3:1 to 2.7:1.

The by-products of the $CH_3Cl+Si$ reaction represent an economical but hitherto untapped source of organisiloxane polymers. The utilization of these by-products has been complicated by the diversity and number of individual components therein. As has been shown above, the boiling points of the individual components are so close to one another that separation is impossible on a commercial scale.

It has been found, however, that after $CH_3SiCl_3$ and $(CH_3)_2SiCl_2$ have been removed from the reaction products of $CH_3Cl$ and Si, the remaining distillable silane by-products can be separated from the nonvolatile residue, as for example, by flash distillation. The entire mixture of said by-products can then be alkoxylated and partially hydrolyzed in a particular fashion to produce an organosiloxane copolymer which is not only relatively economical, but which is also a superior masonry water repellent.

The reasons for the superiority of this material are not at all apparent. The polymeric structure is unknown, for the nature and proportions of many of the starting chlorosilanes are unknown. It is only known that the copolymers obtained by the hereinafter described procedure give improved results when applied to masonry, as compared to the best of the hitherto known masonry treatments.

For purposes of this invention, copolymers are prepared from the by-products of the $CH_3Cl+Si$ reaction in the following manner.

Substantially all of the $CH_3SiCl_3$ and $(CH_3)_2SiCl_2$ are first removed from the reaction products of the $CH_3Cl+Si$ reaction. In the usual industrial distillation this leaves a residue which may contain up to 5 per cent by weight, but usually less, of material boiling at or below the boiling point of the $(CH_3)_2SiCl_2$. This residue is then further distilled to obtain as a distillate a mixture of essentially all the distillable by-produced silicon compounds and hydrocarbons.

The mixture of by-products is then reacted by contacting it with a primary or secondary lower alkyl monohydric alcohol. The preferred alcohols are those of from 1 to 4, inclusive, carbon atoms. The amount of alcohol used is equivalent to at least 30 molar per cent of the hydrolyzable Cl attached to Si in the mixture of by-products. When methanol is used, the best results are obtained by employing an amount equivalent to, or slightly in excess of, the molar quantity of hydrolyzable Cl present. Any excess used will of course not enter into the reaction, but will be present as a solvent in the subsequent hydrolysis step. When alcohols having 2 or more carbon atoms are used, it is preferable to employ a quantity equivalent to from 30 to 80 molar per cent of the hydrolyzable Cl present in the mixture of by-products, although an equivalent amount may be used if desired. Thus, when the higher molecular weight alcohols are used in the alkoxylation step, the preferred range employed leads to a mixture of alkoxychlorosilanes, whereas when methanol is used, it is preferable that the product be essentially completely alkoxylated. If desired, mixtures of the above-defined alcohols may be used.

The alkoxylated product is then partially hydrolyzed by contacting it with water. An inert diluent may be present in this step, but is not essential. The amount of water used is at least equivalent to the molar difference between the hydrolyzable Cl in the original by-product and the amount of alcohol used, but is insufficient to completely hydrolyze more than about 70 molar per cent of the total hydrolyzable groups present. Preferably, the partially hydrolyzed product should, when finished, contain from about 20 to about 50 per cent by weight alkoxy. The physical properties of the resulting product will vary considerably with the amount of water used. As greater amounts of water are used, the extent of hydrolysis and subsequent condensation is increased and the viscosity of the product increases accordingly. These variable properties, however, apparently have little if any effect upon the effectiveness of the product as a masonry water repellent, as long as the preparation is conducted within the defined limits.

If desired, heat may be applied to the partial hydrolyzate in order to speed up the condensation reaction and to aid in the evolution of any HCl which might be present. If any residual HCl remains in the partial hydrolyzate, it is preferable that it be neutralized, as for instance, by contacting the hydrolyzate with $NaHCO_3$.

The finished partial hydrolyzate product is a copolymer containing all of the various organosilyl-substituents and unsubstituted silicon subsituents present in the by-product mixture. The various Si atoms are linked by methylene links, ethylene links, Si—Si bonding, and silicon-oxygen-silicon bonding, and as stated above, the copolymer should contain from 20 to 50 per cent by weight alkoxy. The copolymer may also contain a minor amount of uncondensed hydroxy groups. This copolymer is soluble in the common organic solvents. The solvent-free copolymer is not a resin, but is a fluid which upon exposure to atmospheric moisture further hydrolyzes and condenses to form a nontacky resin.

A further aspect of the invention lies in the addition to the above-defined partial hydrolyzate of up to 100 per cent, and preferably from 10 to 50 per cent, by weight (based on the weight of the hydrolyzate) of the resinous reaction product of a silica hydrosol with certain organo-silicon compounds. The preferred resinous reaction product may be more particularly described as the reaction product of a trimethylsilicon compound selected from the group consisting of $(CH_3)_3SiX$ and $[(CH_3)_3Si]_2O$ where X is chlorine or alkoxy, with a silica hydrosol, in amount such that there is at least 1 mol of the trimethylsilicon unit per mol of $SiO_2$. This resinous reaction product has an average degree of substitution of from 0.7 to 1.4 $CH_3$ groups per silicon atom and is soluble in organic solvents. The reaction between silica hydrosols and the silanes or siloxane proceeds readily at 30° C. or above to produce copolymeric siloxanes. The silanes and the siloxane may be employed individually or in mixture. In those cases in which the chlorosilane is employed, it is unnecessary to add any acid to the reaction mixture, since HCl will be formed in situ. In such cases the chlorosilane may be added directly to the sodium silicate solution. In case where the alkoxysilane or the disiloxane is employed, it is necessary that the silica hydrosol contain sufficient acid so that the pH thereof is less than 5. These resinous reaction products are fully described and claimed in the copending application of William H. Daudt and Leslie J. Tyler, Serial No. 184,720 filed September 13, 1950, now U. S. Patent No. 2,676,182, and assigned to the assignee of the present invention. In brief, the aforesaid application discloses and claims a method wherein compositions of the formula

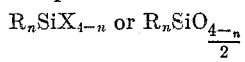

$$R_nSiX_{4-n} \text{ or } R_nSiO_{\frac{4-n}{2}}$$

or mixtures of such compositions, where R is alkyl or monocyclicaryl, X is chlorine or alkoxy, and $n$ has a value from 1 to 3, the average degree of substitution of said composition being from 2.1 to 3R groups per silicon atom, are reacted with a silica hydrosol. The reaction is preferably carried out at a pH of less than 5, and preferably the reactants are employed in such an amount that there is at least one mol of the organosilyl units per mol of $SiO_2$ in the silica hydrosol. The silica hydrosol itself is prepared by reacting a water soluble alkali metal silicate with an acid. Although the above described products would theoretically be similar, for example, to a cohydrolyzate of $SiCl_4$ and $(CH_3)_3SiCl$, such similarity has not been found in comparing properties of the two types of products. When an organosilicon compound other than the preferred trimethyl substituted compounds is employed in the reaction with the silica hydrosol, the average degree of substitution (organic radicals attached directly to silicon per silicon atom) should not be less than 2.1.

Although the use of the above-defined resinous reaction product is not essential in practicing this invention, it has been found that it speeds up the curing time of the partial hydrolyzate described above. When a mixture of the partial hydrolyzate and the resinous reaction product defined above is applied to masonry, improved water-repellent properties are obtained. No advantage has been observed in using a mixture containing more than 50 per cent of the resinous reaction product, however.

The compositions of this invention can be applied to all types of absorbent masonry and joints, as for example, concrete blocks, brick, cinder block, sandstone, stucco, concrete, mortar, water-mixed cement coatings, and water-mixed paints. Such application has been found to render the masonry highly water repellent. It provides a long lasting, deeply penetrating colorless treatment which stops water seepage due to capillary action and thereby decreases staining and efflorescence on the masonry. It helps preserve the masonry and saves inside and outside repair expenses.

In order to obtain maximum penetration of the treatment and to extend the coverage of a given amount of organopolysiloxane, it is preferable to employ a solvent solution of the siloxane mixture. Such a solution may contain from 0.5 to 90 per cent by weight of the organopolysiloxanes, the preferred range for actual application to the masonry being from 1 to 10 per cent by weight. The solvent employed may be practically any organic solvent, the only criterion being that it be capable of dissolving the particular organosiloxanes used. Examples of such solvents are the aromatics such as benzene, toluene, and xylene; cyclics such as cyclohexanone; petroleum solvents such as kerosene, naphtha, Stoddard solvent, and mineral spirits; ethers; alcohols such as ethanol and butanol; ketones such as acetone; chlorinated solvents such as carbon tetrachloride; and carboxylates such as butylacetate. The choice of solvent is thus controlled mainly by such usual considerations as economy, safety, drying time, and penetrating power. Preferred solvents are toluene, xylene, and mineral spirits.

The application can be carried out at extremely low temperatures with no appreciable loss in beneficial properties. The application can be made by the conventional methods of brushing or spraying or, where individual units are treated prior to assembly, by dipping. There is only a slight loss in beneficial properties when the masonry is wetted immediately after being treated. Thus a sudden and unexpected rainstorm at the site of application can do little harm. Beneficial results are obtained even when the composition is applied to wet surfaces, but it is preferable that the application be on a dry surface. The method of this invention does not clog the pores of the masonry, and hence allows the masonry to "breathe." For this reason the method is particularly adaptable to above-grade masonry.

If desired, the compositions of this invention may also be used in conjunction with the conventional organic materials used in treating masonry. The incorporation of such organic materials is sometimes momentarily advantageous. After a short weathering period, however, no advantages of such incorporation have been found.

The present application is a division of Serial Number 232,860 filed June 21, 1951.

In the following examples all parts are expressed as parts by weight unless otherwise indicated.

The concrete blocks used for laboratory testing of the effectiveness of the various treatments were in the form of cubes measuring two inches on a side. They were cast from a composition composed of 21.7 parts Portland cement, 65.2 parts sand, and 13.1 parts water. These blocks weighed about 240 to 260 grams each.

The high boiling by-product chlorosilanes for use in the following examples were obtained by reacting a mixture of HCl and $CH_3Cl$ with a mixture of silicon and copper, at reaction temperatures ranging from 250° to 350° C., in accordance with the teaching of U. S. Patent No. 2,488,487. Essentially all of the chlorosilanes boiling up to and including $(CH_3)_2SiCl_2$ were removed from the reaction products by fractional distillation. The residue from this fractionation was flash distilled to a temperature of 175° C. at an absolute pressure of 50 mm. mercury, to give as a distillate a mixture of the various distillable by-produced chlorosilicon compounds and hydrocarbons. This particular mixture had an analysis of 58.43 per cent by weight Cl and 18.5 per cent Si, showing a Cl:Si atomic ratio of 2.49:1.

*Example 1*

To a mixture of 420 parts of the by-product chlorosilicon compounds and 50 parts toluene was added 227 parts of isopropanol. This amount of isopropanol was equivalent to 55 molar per cent of the Cl present in the mixture of by-products. Then 34 parts of water (also equivalent to 55 molar per cent of the original Cl present) was added. The reaction mixture was heated to from 75° to 85° C. for three hours, then to a temperature of 150° C. at atmospheric pressure to distill off the volatiles. The resulting product was a fluid having a viscosity of about 50 centistokes at 25° C. It had an analysis of 23 per cent by weight Si and 41 per cent by weight isopropoxy. This particular fluid is designated hereafter as fluid (A).

Slight modifications in the amount of alcohol and/or water used in the above procedure produced fluids ranging from 20 to 200 centistokes in viscosity.

When thin films of these fluids were exposed to atmospheric moisture, nontacky resinous films were formed. Solvent solutions were made containing 1 to 10 per cent of the fluids in mineral spirits. When the solutions were applied to sections of a brick wall and allowed to dry, the brick surfaces were all highly water repellent.

*Example 2*

To 68 parts of the by-product chlorosilicon compound was added 43 parts methanol (20 per cent excess of theoretical). The mixture was heated to 67° C. under reflux for eight hours, then heated to 125° C. to distill off the volatiles. 1 part of water (equivalent to 10 molar per cent of the original Cl present) was then added. The reaction mixture was refluxed for one hour at 67° C., then heated to 125° C. to remove the methanol which had been formed. The resulting fluid had a methoxy content of 36 per cent by weight. This fluid is designated hereafter as fluid (B).

Xylene solutions containing 1 to 10 per cent by weight of this fluid were applied to concrete blocks. When the blocks dried, they were all highly water repellent.

*Example 3*

To 100 parts by volume of concentrated HCl was added a mixture of 100 parts by volume sodium silicate (containing 26.7 per cent by weight $SiO_2$ and having a density of 1.36) and 200 parts by volume of water, 100 parts by volume isopropanol, 100 parts by volume hexamethyldisiloxane, and then 100 parts by volume of $(CH_3)_3SiCl$ were rapidly added in that order. The mixture was agitated, forming an emulsion which separated into an oily portion and an aqueous phase. The oily portion was diluted with xylene, washed with water, and the solvent distilled off to give a white powdery resin which was completely soluble in solvents such as toluene and xylene. This resinous reaction product was a copolymer of trimethylsiloxane and $SiO_2$, containing an average of about 1.2 methyl groups per silicon atom.

A mixture of 85 parts of fluid (A) and 15 parts of the above resinous reaction product was made. This mixture is designated hereafter as mixture (C).

Another mixture was made of 85 parts fluid (B) and 15 parts of the resinous reaction product. This mixture is designated hereafter as mixture (D).

Two solutions were made, each containing 3 per cent by weight of mixtures (C) and (D), respectively, in xylene. These solutions were brushed onto two sections of a cinder block wall which had been painted with a cement-base paint. The wall was exposed to natural atmospheric conditions of rain, snow, freezing and thawing for a period of six months. Both sections of the wall were then tested by directing a spray of water against them, and both were found to be extremely water repellent. The water showed no tendency to wet the surfaces.

*Example 4*

Solutions containing fluids (A), (B), or mixture (C) were made up in mineral spirits. Ten two-inch cubic concrete blocks were dried at 80° C. for twenty-four hours and their individual weights noted. The blocks were then placed in water one-quarter inch deep. After twenty-four hours the blocks were removed, blotted, and weighed. The weight gained is expressed as the percentage of the original weight (i. e., weight gained times 100 divided by original weight) in column I of Table II below. The blocks were then dried again for twenty-four hours at 80° C. and after cooling were painted with the various solutions.

The concentration and composition of the material used on each block is shown in column II below. The blocks were then cured twelve days at 25° C., weighed, and again were placed in one-quarter inch of water for twenty-four hours and reweighed. The weight gained is expressed as the percentage of the dry treated weight in column III below. To compensate for slight variations in the untreated blocks, the relative effectiveness of the treatment is shown in column IV as the value of III times 100/I.

TABLE II

| I | II | III | IV |
|---|---|---|---|
| Percent Weight Gained, Untreated | Treatment | Percent Weight Gained, Treated | III×100/I |
| 9.0 | 3% Fluid (A) | 0.46 | 5.1 |
| 8.4 | ----do---- | 0.44 | 5.2 |
| 8.0 | 3% Mix. (C) | 0.21 | 2.6 |
| 8.5 | ----do---- | 0.25 | 2.9 |
| 8.6 | 5% Mix. (C) | 0.21 | 2.4 |
| 8.6 | ----do---- | 0.21 | 2.4 |
| 8.5 | 3% Fluid (B) | 0.21 | 2.5 |
| 8.2 | ----do---- | 0.17 | 2.1 |
| 8.2 | 5% Mix. (C)+½% Al Stearate | 0.13 | 1.6 |
| 8.1 | ----do---- | 0.17 | 2.1 |

The test method described above is in accordance with

ASTM Bulletin No. 156, January 1949, entitled "Testing of Masonry Water Repellents," by F. O. Anderegg. The use of one-quarter inch of water in the test is roughly equivalent to the pressure exerted by a wind velocity of twenty miles per hour.

*Example 5*

Solutions containing 3 per cent by weight of fluid (B) or mixture (D) in mineral spirits were applied to concrete blocks which were given either one, four, eight or thirteen days' curing time at 25° C. The blocks were then tested as in Example 4, with the exception that a constant level bath was used to maintain the one-quarter inch water depth throughout the twenty-four hour immersion period. Table III shows the values obtained for each type of treatment.

TABLE III

| I Percent Wt. Gained, Untreated | II Treatment | III Days' Cure | IV Percent Wt. Gained, Treated | V IV×100/I |
|---|---|---|---|---|
| 6.92 | 3% Fluid (B) | 1 | 0.69 | 10.0 |
| 9.78 | do | 4 | 0.88 | 9.0 |
| 9.63 | do | 8 | 0.95 | 9.9 |
| 9.70 | do | 13 | 0.76 | 7.8 |
| 7.17 | 3% Mix. (D) | 1 | 0.56 | 7.8 |
| 7.11 | do | 4 | 0.56 | 7.9 |
| 9.75 | do | 8 | 0.55 | 5.6 |
| 9.50 | do | 13 | 0.60 | 6.3 |

*Example 6*

Solutions were made up in mineral spirits containing 0.1, 1, 3, and 10 per cent by weight, respectively, of mixture (C). Concrete blocks were treated with the various solutions, cured for twelve days, and tested as in Example 5. Table IV below shows the results obtained.

TABLE IV

| I Percent Weight Gained, Untreated | II Treatment | III Percent Weight Gained, Treated | IV III×100/I |
|---|---|---|---|
| 9.0 | 10% Mix. (C) | 0.20 | 2.2 |
| 9.10 | 3% Mix. (C) | 0.78 | 8.6 |
| 9.05 | 1% Mix. (C) | 3.53 | 39.0 |
| 8.87 | 0.1% Mix. (C) | 5.88 | 66.3 |

*Example 7*

The final effectiveness of a good masonry water repellent treatment should not be affected by such unpredictable factors as the treated material being rained on immediately after the application. In order to test the present materials under such circumstances, two concrete blocks were painted with a 3 per cent solution of mixture (C). One hour after painting the blocks were sprayed thoroughly with water. Then sixteen hours later they were again sprayed. The blocks were allowed to dry for twelve days at 25° C. and tested as in Example 4. The results, shown in Table V, proved that little if any harm was done.

TABLE V

| I Percent Weight Gained, Untreated | II Percent Weight Gained, Treated | III II×100/I |
|---|---|---|
| 8.43 | 0.72 | 8.5 |
| 7.83 | 0.91 | 11.6 |

*Example 8*

Concrete blocks were treated with a 3 per cent solution of mixture (C) and cured for twelve days in open weather at a temperature which ranged from −15° to +35° F. When tested, the blocks showed only slightly less water repellency than was obtained with more normal curing conditions.

That which is claimed is:

1. A composition for rendering masonry materials water repellent comprising a mixture of (I) an organopolysiloxane copolymer consisting of the reaction product formed by the steps comprising (1) separating as a mixture substantially all of the high boiling distillable by-products from the reaction of $CH_3Cl$ and Si to produce methylchlorosilanes, essentially all the components of said mixture having a boiling point above that of $(CH_3)_2SiCl_2$ and said reaction of $CH_3Cl$ and Si having been conducted within the temperature range of 200° to 500° C., (2) alkoxylating said by-products with an alcohol selected from the group consisting of primary and secondary lower alkyl monohydric alcohols, in amount equivalent to at least 30 molar per cent of the hydrolyzable chlorine present in the by-product mixture, and (3) partially hydrolyzing the alkoxylated product with an amount of water at least equivalent to the molar difference between the hydrolyzable chlorine in the aforesaid by-products and the amount of alcohol used, but insufficient to hydrolyze more than 70 molar per cent of the total hydrolyzable groups present; said reaction product containing from 20 to 50 per cent by weight alkoxy, and (II) the resinous reaction product of a silica hydrosol with at least one organosilicon compound containing from 1 to 3 organic groups selected from the group consisting of alkyl and monocyclicaryl radicals attached directly to silicon per silicon atom, said organosilicon compound being selected from the group consisting of chlorosilanes, alkoxysilanes, and organosiloxanes, said resinous reaction product being soluble in xylene and having an average degree of substitution of from 0.7 to 1.4 organic groups selected from the group consisting of alkyl and monocyclicaryl radicals directly attached to silicon per silicon atom, said resinous reaction product being employed in an amount up to 100 per cent by weight based on the weight of the partial hydrolyzate (I).

2. The method of rendering masonry materials water repellent comprising contacting said masonry with the composition of claim 1.

3. A composition for rendering masonry materials water repellent comprising a mixture of (I) an organopolysiloxane copolymer consisting of the reaction product formed by the steps comprising (1) separating as a mixture substantially all of the high boiling distillable by-products from the reaction of $CH_3Cl$ and Si to produce methylchlorosilanes, essentially all the components of said mixture having a boiling point above that of $(CH_3)_2SiCl_2$ and said reaction of $CH_3Cl$ and Si having been conducted within the temperature range of 200° to 500° C., (2) alkoxylating said by-products with an alcohol selected from the group consisting of primary and secondary lower alkyl monohydric alcohols, in amount equivalent to at least 30 molar per cent of the hydrolyzable chlorine present in the by-product mixture, and (3) partially hydrolyzing the alkoxylated product with an amount of water at least equivalent to the molar difference between the hydrolyzable chlorine in the aforesaid by-products and the amount of alcohol used, but insufficient to hydrolyze more than 70 molar per cent of the total hydrolyzable groups present; said reaction product containing from 20 to 50 per cent by weight alkoxy, and (II) the resinous reaction product of a trimethylsilicon compound of the formula $[(CH_3)_3Si]_2O$ with a silica hydrosol in an amount such that there is at least one mol of the trimethylsilicon units per mol of $SiO_2$ in the silica hydrosol, said resinous reaction product being soluble in xylene and having an average degree of substitution of from 0.7 to 1.4 $CH_3$ groups per silicon atom, the aforesaid resinous reaction product being employed in an amount up to 100 per cent by weight based on the weight of the partial hydrolyzate (I).

4. The method of rendering masonry materials water repellent comprising contacting said masonry with the composition of claim 3.

5. A composition for rendering masonry materials water repellent comprising a mixture of (I) an organopolysiloxane copolymer consisting of the reaction product formed by the steps comprising (1) separating as a mixture substantially all of the high boiling distillable by-products from the reaction of $CH_3Cl$ and Si to produce methylchlorosilanes, essentially all the components of said mixture having a boiling point above that of $(CH_3)_2SiCl_2$ and said reaction of $CH_3Cl$ and Si having been conducted within the temperature range of 200° to 500° C., (2) alkoxylating said by-products with an alcohol selected from the group consisting of primary and secondary lower alkyl monohydric alcohols, in amount equivalent to at least 30 molar per cent of the hydrolyzable chlorine present in the by-product mixture, and (3) partially hydrolyzing the alkoxylated product with an amount of water at least equivalent to the molar difference between the hydrolyzable chlorine in the aforesaid by-products and the amount of alcohol used, but insufficient to hydrolyze more than 70 molar per cent of the total hydrolyzable groups present; said reaction product containing from 20 to 50 per cent by weight alkoxy, and (II) the resinous reaction product of a trimethylsilicon compound of the formula $(CH_3)_3SiCl$ with a silica hydrosol in an amount such that there is at least one mol of $(CH_3)_3SiCl$ per mol of $SiO_2$ in the silica hydrosol, said resinous reaction product being soluble in xylene and having an average degree of substitution of from 0.7 to 1.4 $CH_3$ groups per silicon atom, the aforesaid resinous reaction product being employed in an amount up to 100 per cent by weight based on the weight of the partial hydrolyzate (I).

6. The method of rendering masonry materials water repellent comprising contacting said masonry with the composition of claim 5.

7. A composition for rendering masonry materials water repellent comprising a mixture of (I) an organopolysiloxane copolymer consisting of the reaction product formed by the steps comprising (1) separating as a mixture substantially all of the high boiling distillable by-products from the reaction of $CH_3Cl$ and Si, to produce methylchlorosilanes, essentially all the components of said mixture having a boiling point above that of $(CH_3)_2SiCl_2$ and said reaction of $CH_3Cl$ and Si having been conducted within the temperature range of 200° to 500° C., (2) alkoxylating said by-products with an alcohol selected from the group consisting of primary and secondary lower alkyl monohydric alcohols, in amount equivalent to at least 30 molar per cent of the hydrolyzable chlorine present in the by-product mixture, and (3) partially hydrolyzing the alkoxylated product with an amount of water at least equivalent to the molar difference between the hydrolyzable chlorine in the aforesaid by-products and the amount of alcohol used, but insufficient to hydrolyze more than 70 molar per cent of the total hydrolyzable groups present; said reaction product containing from 20 to 50 per cent by weight alkoxy, and (II) the resinous reaction product of a trimethylsilicon compound of the formula $(CH_3)_3SiX$ where X is an alkoxy radical, with a silica hydrosol, in an amount such that there is at least one mol of the trimethylsilicon compound per mol of $SiO_2$ in the silica hydrosol, said resinous reaction product being soluble in xylene and having an average degree of substitution of from 0.7 to 1.4 $CH_3$ groups per silicon atom, the aforesaid resinous reaction product being employed in an amount up to 100 per cent by weight based on the weight of the partial hydrolyzate (I).

8. The method of rendering masonry materials water repellent comprising contacting said masonry with the composition of claim 7.

9. A composition for rendering masonry materials water repellent comprising a mixture of (I) an organopolysiloxane copolymer consisting of the reaction product formed by the steps comprising (1) separating as a mixture substantially all of the high boiling distillable by-products from the reaction of $CH_3Cl$ and Si to produce methylchlorosilanes, essentially all the components of said mixture having a boiling point above that of $(CH_3)_2SiCl_2$ and said reaction of $CH_3Cl$ and Si having been conducted within the temperature range of 200° to 500° C., (2) alkoxylating said by-products with an alcohol selected from the group consisting of primary and secondary lower alkyl monohydric alcohols, in amount equivalent to at least 30 molar per cent of the hydrolyzable chlorine present in the by-product mixture, and (3) partially hydrolyzing the alkoxylated product with an amount of water at least equivalent to the molar difference between the hydrolyzable chlorine in the aforesaid by-products and the amount of alcohol used, but insufficient to hydrolyze more than 70 molar per cent of the total hydrolyzable groups present; said reaction product containing from 20 to 50 per cent by weight alkoxy, and (II) the resinous reaction product of a silica hydrosol with both $(CH_3)_3SiCl$ and $[(CH_3)_3Si]_2O$, the reactants being employed in an amount such that there is at least one mol of the combined methyl substituted silicon units per mol of $SiO_2$ in the silica hydrosol, said resinous reaction product being soluble in xylene and having an average degree of substitution of from 0.7 to 1.4 $CH_3$ groups per silicon atom, the aforesaid resinous reaction product being employed in an amount up to 100 per cent by weight based on the weight of the partial hydrolyzate (I).

10. The method of rendering masonry materials water repellent comprising contacting said masonry with the composition of claim 9.

References Cited in the file of this patent

UNITED STATES PATENTS

| | | |
|---|---|---|
| 2,413,582 | Rust | Dec. 31, 1946 |
| 2,438,520 | Robie et al. | Mar. 30, 1948 |
| 2,441,422 | Kreible et al. | May 11, 1948 |
| 2,562,953 | Rust | Aug. 7, 1951 |
| 2,574,168 | Brick | Nov. 6, 1951 |